United States Patent [19]
Ohtaka et al.

[11] Patent Number: 5,670,756
[45] Date of Patent: Sep. 23, 1997

[54] SILENCER

[75] Inventors: Akihiko Ohtaka; Nobuyuki Yoshitoshi; Shigeo Kimura, all of Hamamatsu; Taketoshi Houjou; Kazuya Nimiya, both of Aichi-ken, all of Japan

[73] Assignee: Honda Giken Kogyo Kabushiki Kaisha, Saitama-ken, Japan

[21] Appl. No.: 533,178

[22] Filed: Sep. 25, 1995

[51] Int. Cl.$^6$ ...................................................... F01N 1/24
[52] U.S. Cl. ............................ 181/256; 181/266; 181/272
[58] Field of Search ................................. 181/227, 228, 181/224, 252, 255, 256, 258, 265, 266, 269, 272, 282

[56] References Cited

U.S. PATENT DOCUMENTS

| | | | |
|---|---|---|---|
| 4,104,426 | 8/1978 | Gonzalez et al. | 181/227 X |
| 4,119,174 | 10/1978 | Hoffman | 181/272 X |
| 4,192,402 | 3/1980 | Nakagawa et al. | 181/272 X |
| 4,598,790 | 7/1986 | Uesugi et al. | 181/252 |
| 5,227,593 | 7/1993 | Takahashi et al. | 181/255 |

*Primary Examiner*—Khanh Dang
*Attorney, Agent, or Firm*—Townsend & Banta

[57] ABSTRACT

A silencer is comprised of an outer sleeve, an inner sleeve having a number of pores, and sound absorbing material including heat-resistant fibers packed between the outer sleeve and the inner sleeve. The sound absorbing material is wound directly around the outside of inner sleeve with two or more turns so that the thickness of wound sound absorbing material around the inner sleeve is greater than dimension of a gap between the inner sleeve and the outer sleeve to give interference between sound absorbing material and the inner and outer sleeves. The sound absorbing material with the inner sleeve is press-fitted into the outer sleeve. According to the present invention, sound absorbing material is prevented from being blown out by exhaust gas flowing through the inside of the inner sleeve so that the silencer is improved in durability. The dimensional stability of the outer diameter of sound absorbing material wound around the inner sleeve can be gained so that the press-fitting operation of sound absorbing material wound around the inner sleeve can be performed stably and the density of sound absorbing material can be stabilized.

7 Claims, 5 Drawing Sheets

(a)

(b)

(a)

(b)

SILENCER

BACKGROUND OF THE INVENTION

1. Field of the Invention

The present invention relates to a silencer comprised of an outer sleeve, an inner sleeve having a number of pores, and an acoustic material or sound absorbing material including heat-resistant fibers packed between the outer sleeve and the inner sleeve.

2. Description of the Prior Art

A silencer or a sound deadener used for an internal combustion engine such as a automobile engine and the like is generally comprised of an outer sleeve, an inner sleeve having a number of pores, and sound absorbing material including heat-resistant fibers of glass wool or the like, wherein the sound absorbing material packed between the outer sleeve and the inner sleeve has the predetermined density and thickness, is formed into a tubular shape, and a portion of the circumference of the formed tubular sound absorbing material is cut in the longitudinal direction thereof. The sound absorbing material is attached to the inner sleeve in such a manner that an outer surface of the inner sleeve is surrounded by the sound absorbing material, and the sound absorbing material with the inner sleeve is press-fitted into the inside of the outer sleeve.

The press fit of the sound absorbing material into the outer sleeve can be made by putting axial thrust to the sound absorbing material with the inner sleeve and press-fitting the sound absorbing material with the inner sleeve into the inside of the outer sleeve while pressing the outer circumference of the sound absorbing material surrounding the inner sleeve to be restricted within the predetermined scope, because the outer diameter of the sound absorbing material surrounding the inner sleeve becomes larger than the inner diameter of the outer sleeve by a size corresponding to the predetermined interference. However, there is a problem that when the sound absorbing material with the inner sleeve, is press-fitted into the outer sleeve, friction is generated at a contacting surface of the sound absorbing material to the outer sleeve, which causes buckling of the sound absorbing material by which the press fit becomes difficult or impossible.

In order to solve the above-mentioned problem, a technique was proposed as disclosed in Japanese Utility Model Publication No. 36885/90. The technique is characterized in that heat-resistant fibers are bonded by a heat-resistant binder in such a manner that the inside of the tubular sound absorbing material becomes soft and the outside of the tubular sound absorbing material becomes hard, and a portion of the circumference of the formed sound absorbing material is cut in the longitudinal direction. The tubular sound absorbing material with the longitudinal cut is press-fitted between an inner plate and an outer plate.

However, in the technique shown in Japanese Utility Model Publication No. 36885/90, there is a problem that since a longitudinal cut is made in the circumference of the sound absorbing material, even in the case where the inside of the sound absorbing material which is brought into contact with the porous inner plate is made hard by a heat-resistant binder, the condition of the cut surfaces being brought into intimate contact with each other through the whole axial length thereof cannot be maintained so that the gap occurs between both cut surfaces. Therefore, in the case where exhaust gas having high-pressure and high-temperature is flown into an inner sleeve, there is a fear that heat-resistant fibers of glass wool or the like included in the sound absorbing material are blown out by exhaust gas blowing between the inner sleeve and the sound absorbing material.

Further, when the inner sleeve is surrounded by sound absorbing material, the outer circumferential surface of the inner sleeve and the surface of the sound absorbing material which is brought into contact with the outer circumferential surface of the inner sleeve are not held to each other. Therefore, there is a problem that when the sound absorbing material with the inner sleeve is press-fitted into the outer sleeve by putting thrust to the sound absorbing material with the inner sleeve, slippage between the inner sleeve and the sound absorbing material occurs.

Further, in the same manner as in a conventional case, in the case where the sound absorbing material is composed of glass wool, there is a problem that a range over which the thickness of the glass wool layer changes is large, the interference cannot be accurately obtained under the state where the inner sleeve is surrounded by the sound absorbing material, and besides there is not any number of degrees of interference freedom when a size of interference is set.

There is a case where in order to get the accurate interference, the sound absorbing material is formed into the predetermined size and shape by means of a jig, a portion of the circumference of the formed sound absorbing material is cut in the longitudinal direction, and then the inner sleeve is surrounded by the formed sound absorbing material with a longitudinal cut. However, there is a problem that even in such a method, errors of the interference cannot be removed perfectly, and the for making a silencer becomes complicated.

SUMMARY OF THE INVENTION

Accordingly, it is an object of the present invention to provide a silencer in which heat-resistant fibers included in the sound absorbing material is prevented from being blown out by exhaust gas by which the silencer is improved in durability, the interference can be accurately predetermined, and the number of degrees of interference-setting freedom is large.

In order to solve the above-mentioned problem, a silencer according to the present invention is characterized in that the silencer comprises an outer sleeve, an inner sleeve having a number of pores, and sound absorbing material including heat-resistant fibers packed between the outer sleeve and the inner sleeve, wherein the sound absorbing material is wound directly around the outside of inner sleeve with two or more turns so that the thickness of wound sound absorbing material around the inner sleeve is greater than the dimension of a gap between the inner sleeve and the outer sleeve to give interference between the sound absorbing material and the inner and outer sleeves, and the sound absorbing material with the inner sleeve is press-fitted into the outer sleeve.

In the above-mentioned silencer, it is preferable that a contacting surface of the sound absorbing material to the inner sleeve and a contacting surface thereof to the outer sleeve are coated with binder to become hard.

As mentioned hereinbefore, in the silencer according to the present invention, since the sound absorbing material is wound directly around the outside of the inner sleeve with two or more turns, firstly, a portion of the sound absorbing material is wound directly around the outside of the inner sleeve, and further the extension of the above-mentioned portion of the sound absorbing material is wound around the outside of the above-mentioned portion of the sound absorbing material which has been wound around the inner sleeve so that surfaces of the sound absorbing material, which are brought into contact with each other, run to draw a swirl from the outside of the inner sleeve to the inside of the outer sleeve. Accordingly, a restoring force of the sound absorbing material, which is caused by the press-fit of the sound absorbing material with the inner sleeve into the outer sleeve, acts on the above-mentioned contacting surfaces of the sound absorbing material so that the above-mentioned contacting surfaces of the sound absorbing material are brought into intimate contact with each other by which the holding strength of the sound absorbing material to the inner sleeve and the outer sleeve is improved. Further, heat-resistant fibers included in the sound absorbing material are restrained from being moved by binder coatings which are applied on the sound absorbing material so that heat-resistant fibers can be prevented from being blown out by exhaust gas.

Further, to wind the sound absorbing material with two or more turns around the outside of the inner sleeve enables a change of the sound absorbing material in a size thereof to be compensated by the adjustment of the number of turns. Accordingly, the interference can be made accurately equal to the predetermined value, by adjusting the number of turns according to the outer diameter of the sound absorbing material after the sound absorbing material is wound around the inner sleeve two or more times. Further, the number of degrees of interference freedom can be increased.

Further, to harden both a contacting surface of the sound absorbing material to the inner sleeve and a contacting surface of the sound absorbing material to the outer sleeve by applying binder to both the contacting surfaces makes it possible that the sound absorbing material with the inner sleeve which is surrounded by the sound absorbing material to be inserted into the inside of the outer sleeve, while the sound absorbing material is held together with the inner sleeve as a unit, and that even if a frictional force between the sound absorbing material and the outer sleeve is applied to the outside of the sound absorbing material and the inside of the outer sleeve, the sound absorbing material with the inner sleeve can be smoothly press-fitted into the outer sleeve, without buckling of the periphery of the sound absorbing material and without the slippage between the sound absorbing material and the inner sleeve.

Surfaces of the sound absorbing material which are coated with binder are only surfaces corresponding to the inner sleeve and the outer sleeve, while the other portion of the sound absorbing material is left as it is so that elasticity of the other portion of the sound absorbing material is preserved. Accordingly, an intermediate layer of the sound absorbing material which is wound around the inner sleeve has the original elasticity. After the sound absorbing material with the inner sleeve is press-fitted into the outer sleeve, the sound absorbing material is pressed against the inner sleeve and the outer sleeve by restoring force of the sound absorbing material, and besides the predetermined density of the sound absorbing material can be restored.

DESCRIPTION OF THE PREFERRED EMBODIMENT

Referring now to FIGS. 1 through 6, an embodiment of the present invention is explained. In these Figures, a silencer A comprises outer sleeve 1 and inner sleeve 2 formed with a number of pores 2a. Sound absorbing material 3 including heat-resistant fibers of glass wool or the like is wound around the outside of inner sleeve 2 with two or more turns. Sound absorbing material 3 with inner sleeve 2 is press-fitted into outer sleeve 1.

Figure 2:
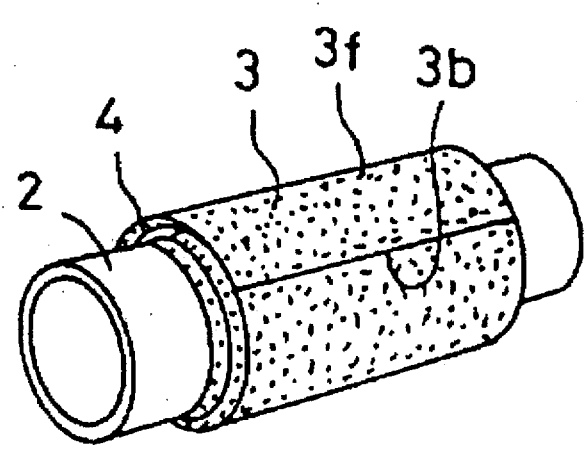
FIGS. 2(a) (b) are views for showing a state where sound absorbing material is wound around an inner sleeve in the embodiment of present invention, FIG. 2(a) being a perspective view and FIG. 2(b) being a sectional view.
Figure 2:
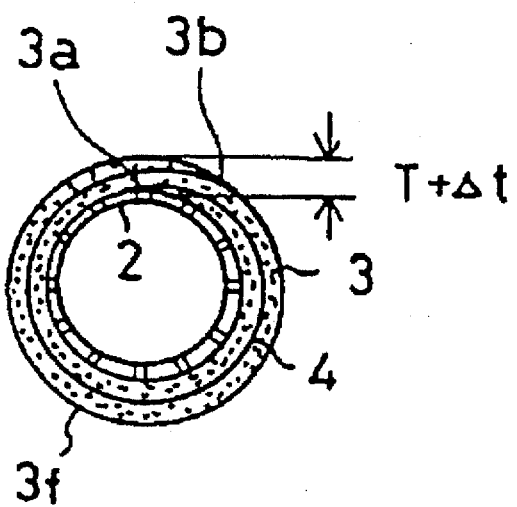

Sound absorbing material 3 has the predetermined size according to size T of a gap formed between the inside of outer sleeve 1 and outside of inner sleeve 2. After winding with given turns of sound absorbing material 3 around the outside of inner sleeve 2 (two turns in the present embodiment), as shown in FIG. 2, the thickness of sound absorbing material 3 wound from inner sleeve 2 to outer sleeve 1 amounts to T=Δt including the given interference Δt, so that the density of sound absorbing material 3 comes to the predetermined density when sound absorbing material 3 with inner sleeve 2 is press-fitted. Both end portions of sound absorbing material 3 are cut in such a manner that both end portions of sound absorbing material are shaped gradually thinner toward the respective edges thereof, and sound absorbing material 3 is wound around inner sleeve 2 in such a manner that both the end portions shaped gradually thinner toward the respective edges thereof overlaps each other, by which the thickness of sound absorbing material 3 wound around inner sleeve 2 becomes uniform, in which interference Δt unchanges over the whole circumference. Therefore, when sound absorbing material 3 with inner sleeve 1 is press-fitted into the inside of outer sleeve 1, a uniform press-fit resistance can be obtained. Accordingly, a worker can smoothly press-fit sound absorbing material 3 with inner sleeve 2 into outer sleeve 1 without the necessity of any deflection of force, by pressing inner sleeve 2 into outer sleeve in parallel with outer sleeve 1.

Binder is applied on the contacting surface of sound absorbing material 3 to inner sleeve 2, and the contacting surface of sound absorbing material to outer sleeve 1 so that both the contacting surfaces become hard. As shown in FIGS. 4(a), (b), both the end portions 3a, 3b of sound absorbing material 3 are cut in such a manner that both end portions 3a, 3b of sound absorbing material 3 are shaped gradually thinner toward the respective edges thereof. Further, binder is applied to a first coating surface 3d on one side 3c of sound absorbing material 3 in the vicinity of one end 3a thereof, which occupies an area with a width nearly corresponding to the outer circumference of inner sleeve 2, while binder is applied to a second coating surface 3f on the other side 3e of sound absorbing material 3 in the vicinity of the other end portion 3b, which occupies an area with a width nearly corresponding to the inner circumference of outer sleeve 1.

Binders for making sound absorbing material 3 hard is not limited to specific binders. In the present invention, inorganic binder including silica and alumina as main components can be used. However, for example, glass wool adhesive including kaolin and bentonite as main components can be also used.

After binder aqueous solution is applied to coating surfaces 3d, 3f which are formed over a given width from edge 3a and edge 3b, respectively, sound absorbing material 3 is wound around the outside of inner sleeve 2, then the outside of sound absorbing material wound around inner sleeve 2 is formed into a given shape, and thereafter sound absorbing material is dehydrated in a drying process. In this time, glass cloth (not shown) may be previously wound around the outside of inner sleeve 2. Further, when sound absorbing material 3 is wound around inner sleeve 2, it is preferable to apply an appropriate tension to sound absorbing material 3. Tension applied to sound absorbing material 3 enables sound absorbing material to be wound around inner sleeve 2 with an even thickness. When sound absorbing material 3 is wound around inner sleeve 2, glass cloth can be protruded to some extent into holes 2a formed in inner sleeve 2, and so the holding force and the adherence of wall portion 2b of inner sleeve 2 to glass cloth can be increased.

Figure 3:
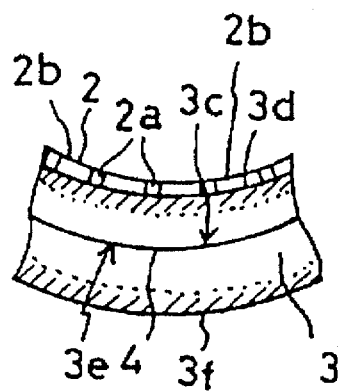
FIG. 3 is an enlarged sectional view of an essential portion shown in FIG. 2(b)
Figure 4:
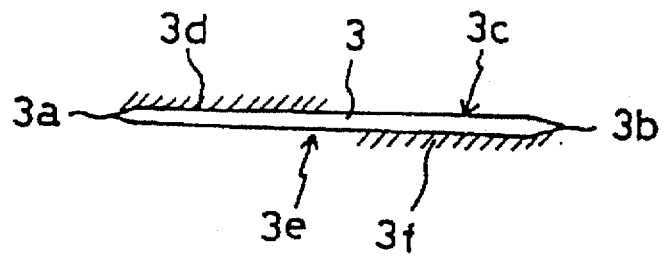
FIGS. 4(a) (b) are views for showing a state where the sound absorbing material is wound around the inner sleeve in the embodiment of the present invention, FIG. 4(a) being a side view of the sound absorbing material used in the embodiment of the present invention, and FIG. 4(b) being a perspective view of the inner sleeve and the sound absorbing material.
Figure 4:
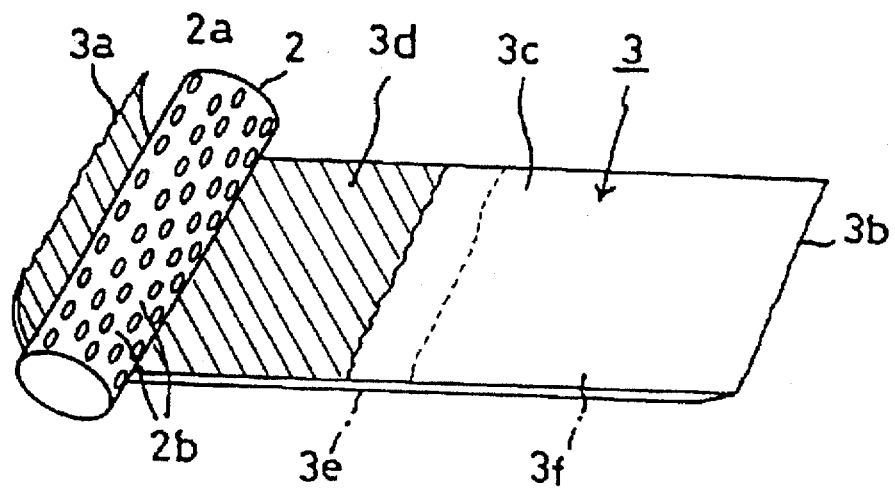

After sound absorbing material 3 is wound around inner sleeve 2, while the shape of wound sound absorbing material 3 around inner sleeve 2 is held, sound absorbing material 3 is dried. By this drying operation, as shown in FIG. 3, hardened portions of binder-coating surface 3d, 3f on surfaces 3c, 3e of sound absorbing material 3 are provided on the inside and on the outside of sound absorbing material 3, while binder-uncoated regions are brought into contact with each other so that contacting surfaces 4 are formed by which the elasticity of sound absorbing material 3 is reserved.

Figure 5:
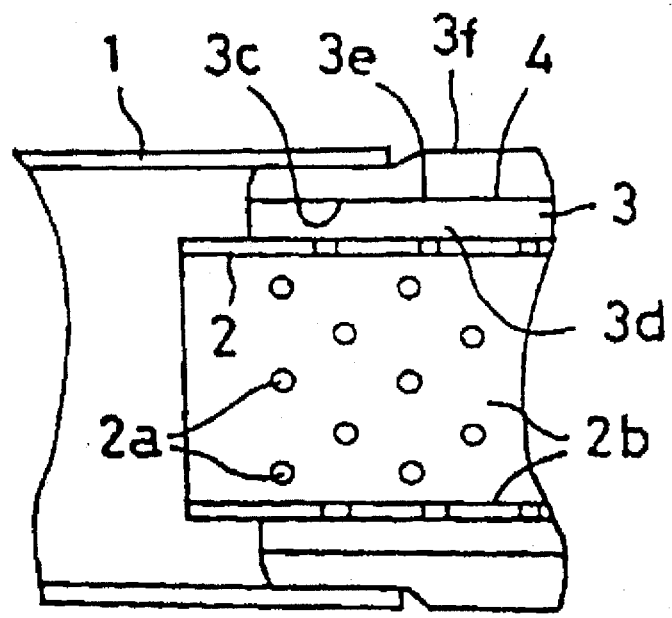
FIG. 5 is a schematic representation for showing a state where the sound absorbing material with the inner sleeve is inserted into the outer sleeve.

After sound absorbing material 3 is wound around the outside of inner sleeve 2 with given turns, as shown in FIG. 5, inner sleeve 2 and sound absorbing material 3 are press-fitted into outer sleeve 1. Coating surface 3d which is brought into contact with the outside of inner sleeve 2 is hardened by binder at a state where glass cloth is protruded to some extent into holes 2a formed in inner sleeve 2. Accordingly, inner sleeve 2 and sound absorbing material 3 are held together as a unit by the projected portion of glass cloth of 3d, so that the slippage of sound absorbing material 3 to inner sleeve 2 which can be prevented from being caused by axial thrust applied to inner sleeve 2 when sound absorbing material 3 with inner sleeve 2 is press-fitted into outer sleeve 1. Further, exhaust gas which flows in the inside of inner sleeve 2 is brought into contact with coating surface 3d of sound absorbing material 3 through a plurality of holes 2a, notwithstanding the exhaust gas has high pressure and high temperature, blowing out or scattering of sound absorbing material 3 caused by exhaust gas can be suppressed to a minimum. Hardened binder-coating surface 3f of sound absorbing material 3 which is brought into outer sleeve 1 of sound absorbing material gives the rigidity and the lubricity to sound absorbing material 3. Therefore, even if friction is caused between sound absorbing material 3 and outer sleeve 1 by thrust which is applied to inner sleeve 2 when sound absorbing material with inner sleeve is press-fitted into outer sleeve 1, the occurrence of buckling in sound absorbing material 3 can be prevented.

Figure 1:
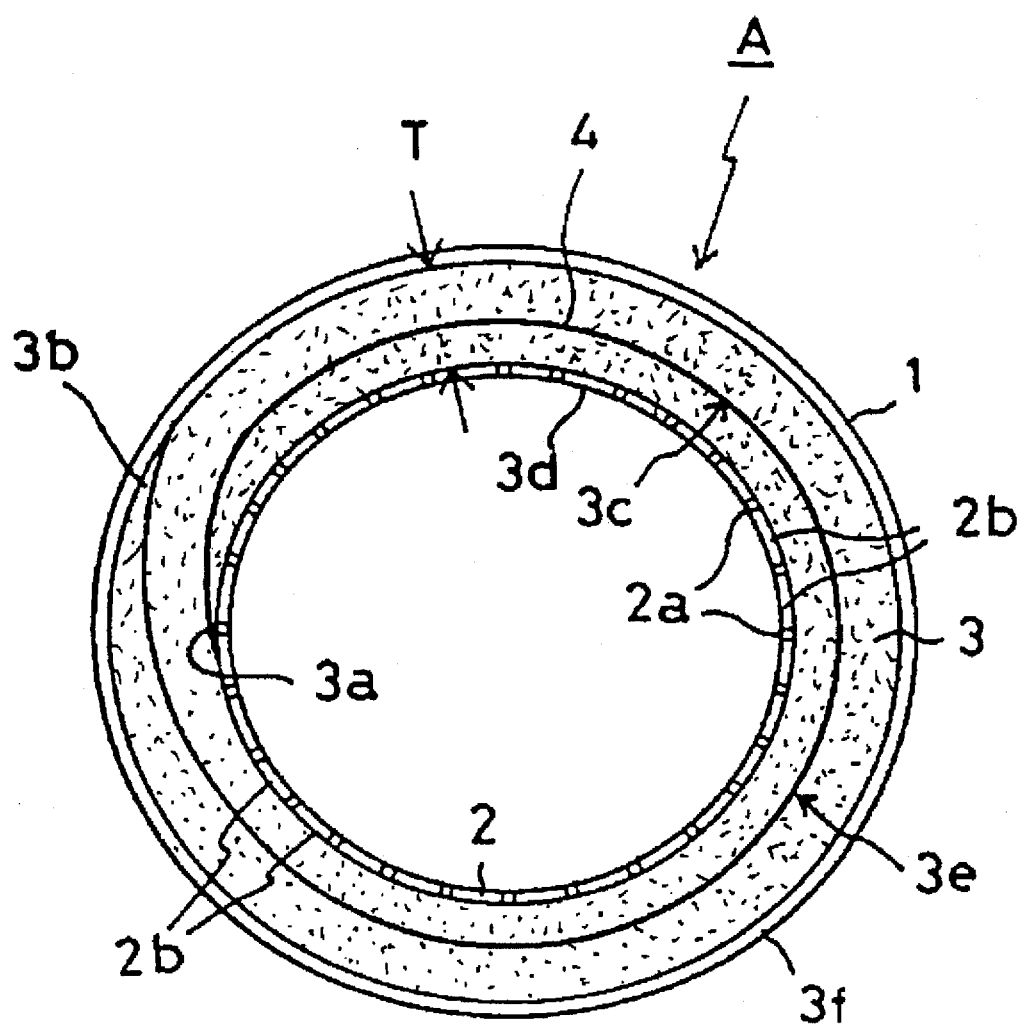
FIG. 1 is a side of a silencer of an embodiment of the present invention.

When pressing of sound absorbing material 3 with inner sleeve 2 into outer sleeve 1 has finished, restoring force is applied to sound absorbing material 3 corresponding to interference Δt. Further, contacting surface 4 of surface 3c to surface 3e of sound absorbing material 3, as shown in FIG. 1, is disposed in the circumferential direction along the gap formed between outer sleeve 1 and inner sleeve 2, from end portion 3a of sound absorbing material 3 which is brought into contact with the outside of inner sleeve 2 toward end portion 3b thereof which is brought into contact with the inside of outer sleeve 1. Accordingly, binder-uncoated regions which are surfaces 3c, 3e forming contacting surfaces 4 are brought into intimate contact with each other, so that there is not any fear that sound absorbing material 3 is blown out by exhaust gas flowing along contacting surfaces 4, even if exhaust gas having high pressure and high temperature flows in the inside of inner sleeve 2, and the exhaust gas 3 acts on sound absorbing material 3 through holes 2a.

Figure 6:
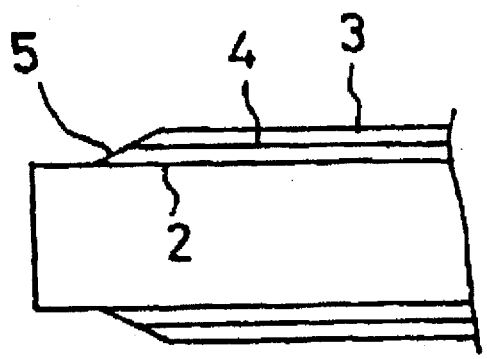
FIG. 6 is a schematic view for showing an axial end of the sound absorbing material wound around the inner sleeve in the embodiment of the present invention.

In the above-mentioned embodiment, a case where sound absorbing material 3 with the outside of inner sleeve 2 is press-fitted simply into outer sleeve 1 is explained. However, as shown in FIG. 6, end portion 5 of sound absorbing material 3 which is wound around inner sleeve 2 is cut or formed preferably into a tapered end portion. Such a machining of sound absorbing material 3 enables sound absorbing material 3 with inner sleeve 2 to be easily press-fitted into outer sleeve 1.

The number of windings in sound absorbing material 3 around inner sleeve 2 is preferably more than two turns, for preventing sound absorbing material 3 from being blown out by exhaust gas. However, by winding sound absorbing material 3 around inner sleeve 2 with three turns, four turns or more by using thinner sound absorbing material 3, the outer diameter of sound absorbing material 3 which changes corresponding to the range of variations in size of sound absorbing material 3 can be stably set.

It is sufficient for contacting surface 4 of sound absorbing material 3 to be disposed over the distance corresponding to one circumference, for preventing sound absorbing material 3 from being blown out by exhaust gas. Therefore, the number of turns of sound absorbing material 3 can be set, on the basis of the outer diameter of wound sound absorbing material 3, concerning a winding portion of from a second turn. Accordingly, when the thickness of sound absorbing material 3 varies, the outer diameter of sound absorbing material can be set to the desired size by setting a length of sound absorbing material 3 corresponding to the actual thickness of sound absorbing material 3 and by adjusting the winding angle of a second turn. In this case, since the outer diameter of sound absorbing material 3 is nearly within a limited region, press-setting operation of sound absorbing material 3 into outer sleeve 1 can be stably performed.

As the above-mentioned, since the outer diameter of sound absorbing material 3 wound around the outside of inner sleeve 2 can be suitably set, an interference for sound absorbing material 3 can be set at a desired value. Namely, the density of sound absorbing material 3 in silencer A can be suitably set, so that the number of degrees of freedom in altering sound absorbing performance and setting operation of the sound absorbing material 3 into outer sleeve 1 can be stably performed.

Figure 7:
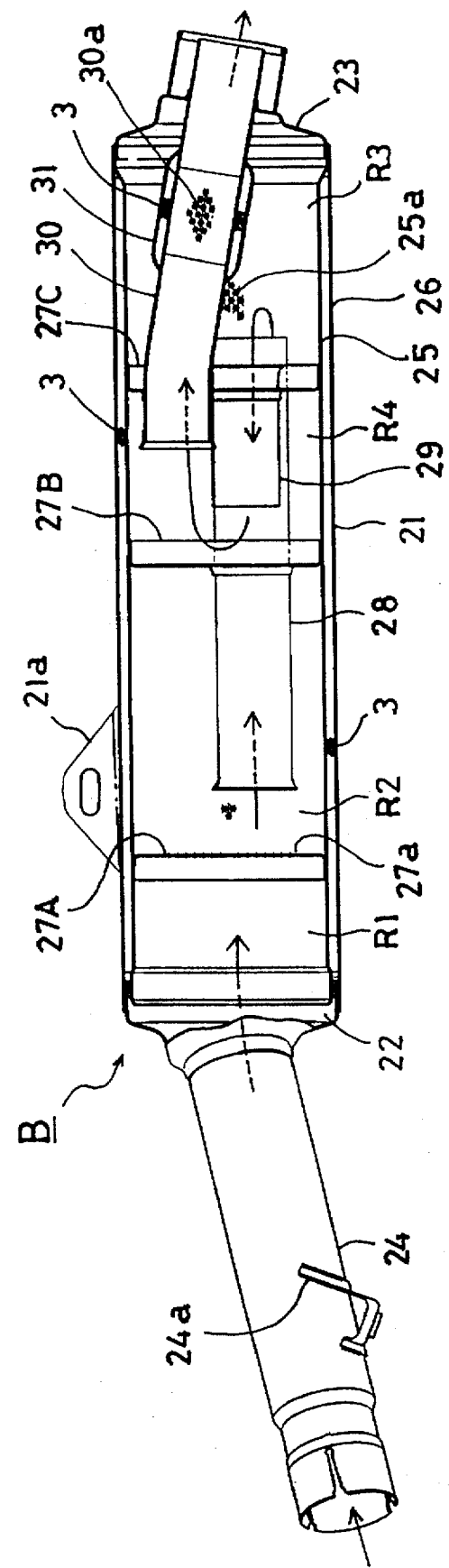
FIG. 7 is a sectional side view for showing an example of application of the silencer in the embodiment of the present invention for a motorcycle.

Then, referring to FIG. 7, an another embodiment of silencer according to the present invention is explained. The silencer is used for a motorcycle. For a car, a combination of silencer A and silencer B having the following construction, both of which are arranged in a series, is used.

Silencer B is comprised of cylindrical body 21 formed with openings at front and rear ends, and front and rear caps 22, 23 for closing openings at the front and rear ends, wherein front cap 22 is connected with exhaust pipe 24 of internal combustion engine. Silencer B is attached to a car body by means of brackets 21a which is attached to silencer body 21 and bracket 24a formed on exhaust pipe 24.

Cylindrical body 21 is comprised of inner sleeve 25 having a number of holes 25a and outer sleeve 26 coaxially surrounding inner sleeve 25, wherein inner sleeve 25 and outer sleeve 26 forms a double-walled pipe. Sound absorbing material 3 is inserted into a circular gap between inner sleeve 25 and outer sleeve 26 by the above-mentioned method. Namely, sound absorbing material 3 is wound around inner sleeve 25 with two or more turns, and press-fitted into the inside of outer sleeve 26 with a given interference.

The internal space of inner sleeve 25 is separated into first, second, fourth and third exhaust gas expansion chambers R1, R2, R4, R3 from the left toward the right of the drawing. First, separator 27A has a number of small holes 27a, and first exhaust gas expansion chamber R1 are communicated with second exhaust gas expansion chamber R2 through small holes 27a. Further, first communication pipe 28 is mounted through second separator 27B and third separator 27C, and second exhaust gas expansion chamber R2 is communicated with third exhaust gas expansion chamber R3 through first communication pipe 28. Further, second communication pipe 29 is mounted through third separator 27C and third exhaust gas expansion chamber R3 is communicated with fourth exhaust gas expansion chamber R4 through second communication pipe 29. Furthermore, exhaust gas emission pipe 30 for communicating fourth exhaust gas expansion chamber R4 with the outside of silencer B is mounted through third separator 27C and rear cap 23.

In the above-mentioned silencer B, exhaust gas exhausted from an exhaust port of internal combustion engine is collected into exhaust gas pipe 24 by means of a manifold (not shown), and collected exhaust gas is sent into silencer body 21. First, first expansion of exhaust gas which reached silencer body 2 is made in first exhaust gas expansion chamber R1, then exhaust gas is sent through small holes 27a, while being squeezed by small holes 27a, into second exhaust gas expansion chamber R2, in which second expansion of exhaust gas is made, then exhaust gas is sent through first communication pipe 29, into third exhaust gas expansion chamber R3, in which third-expansion of exhaust gas is made. Then, exhaust gas is sent through second communication pipe 29, into fourth exhaust gas expansion chamber R4, in which fourth-expansion of exhaust gas is made. Then, finally, exhaust gas is exhausted to the outside of silencer B through exhaust gas emission pipe 30. Namely, while exhaust gas exhausted from internal combustion engine passes through first, second, third, and fourth exhaust gas expansion chambers R1, R2, R3, R4, expansion and shrinkage of exhaust gas are repeated. Then, sound absorbing material 3 inserted between inner sleeve 25 and outer sleeve 25 decreases exhaust noise which occurs when exhaust is made.

A portion of exhaust gas emission pipe 30 has a number of small holes 30a, outer sleeve 31 is mounted surrounding the portion of exhaust emission pipe 30, and sound absorbing material 3 is inserted into a gap between the portion of exhaust gas emission pipe 30 and outer sleeve 31. Accordingly, decrease in exhaust noise is made in the two steps.

As above-mentioned, in a silencer according to the present invention, sound absorbing material is wound around the outside of an inner sleeve with two or more turns, then contacting surfaces of sound absorbing material are disposed in a gap between an outer sleeve and the inner sleeve in the circumferential direction, while restoring force of sound absorbing material is applied to the whole contacting surfaces by which the contacting surfaces are brought into intimate contact with each other. Therefore, even if pressure of exhaust gas flowing in the inside of the inner sleeve is applied to the sound absorbing material, there is not any fear that exhaust gas blows through a gap between sound absorbing material and inner sleeve. Accordingly, sound absorbing material is prevented from being blown out by exhaust gas so that the silencer can be improved in durability.

Further, the dimensional stability of the outer diameter of sound absorbing material wound around a inner sleeve can be gained, by winding sound absorbing material around the outside of the inner sleeve with two or more turns. Accordingly, the amount of scatter in size of the outer diameter of sound absorbing material occurring when sound absorbing material with an inner sleeve is press-fitted into outer sleeve can be minimized so that the press-fitting operation can be stably performed, and the stability in density of sound absorbing material disposed between an inner sleeve and an outer sleeve can be gained.

Further, since the dimensional stability of the outer diameter of sound absorbing material wound around an inner sleeve can be gained, the number of degrees of freedom in setting interference for sound absorbing material can be improved, by setting suitably the dimension of the outer diameter. Accordingly, the desired sound absorbing performance can be shown, by suitably setting the density of sound absorbing material in a silencer.

Further, since the dimension of the outer diameter wound around an inner sleeve can be stabilized, notwithstanding dimension of sound absorbing material is varied, or since interference can be set at the desired value for sound absorbing material. Also, in a manufacturing process, the press-fit of sound absorbing material with an inner sleeve into an outer sleeve becomes easy so that the assembly process can be rationally performed.

Further, in a case where a contacting surface of sound absorbing material to an inner sleeve and a contacting surface of sound absorbing material to an outer sleeve are hardened by coating binder to both contacting surfaces, sound absorbing material and an inner sleeve can be held together as a unit and the rigidity of a contacting surface of sound absorbing material to an outer sleeve. Slippage of sound absorbing material against an inner sleeve occurring when sound absorbing material wound around an inner sleeve is press-fitted into an outer sleeve can be prevented, and buckling of sound absorbing material can be prevented so that sound absorbing material with an inner sleeve can be easily press-fitted into an outer sleeve.

Further, blowing out of sound absorbing material occurring when sound absorbing material is brought into contact with exhaust gas flowing through a number of holes formed in an inner sleeve from the inside of the inner sleeve toward sound absorbing material can be minimized.

Although the invention has been described in its preferred form, this invention may be embodied in several forms without departing from the spirit of essential characteristics thereof. Therefore, the present invention is illustrative and not restrictive, since the scope of the invention is defined by the appended claims than by the description preceding them.

What is claimed is:

1. A silencer comprising an outer sleeve, an inner sleeve having a number of pores, and a sound absorbing material including heat-resistant fibers packed between said outer sleeve and said inner sleeve, wherein said sound absorbing material is first wound directly around an outside of said inner sleeve with two or more turns so that wound sound absorbing material occupies a space greater than a space between said inner sleeve and outer sleeve, the wound sound absorbing material over the inner sleeve is then press-fitted into the outer sleeve.

2. The silencer as in claim 1, wherein a wind-starting tip and a wind-ending tip of said sound absorbing material are formed into a tapered sectional shape so that a thickness of an overlapped portion of said tips is constant and the wound sound absorbing material has a uniform thickness over its entire circumference when sound absorbing material has been wound around said inner sleeve.

3. The silencer as in claim 1, wherein surfaces of the sound absorbing material which contact said inner and outer sleeves are coated with binder to harden said surfaces of the sound absorbing material.

4. The silencer as in claim 1, wherein a glass cloth is laid between said sound absorbing material and said inner sleeve, and portions of said glass cloth protrude into said pores formed in the inner sleeve, thereby increasing a holding force between said inner sleeve and said sound absorbing material.

5. The silencer as in claim 1, wherein the inner sleeve is divided into a plurality of exhaust gas expansion chambers, one of said exhaust gas expansion chambers being connected to an exhaust pipe which is connected with an internal combustion engine, while another of said exhaust gas expansion chambers is connected to an exhaust gas emission pipe for emitting exhaust gas outside of the silencer, and all of said exhaust gas expansion chambers communicating with one other to form an exhaust channel.

6. The silencer as in claim 5, wherein the inner sleeve is divided into a first, second, third, and fourth exhaust gas expansion chamber, in line, and the first, second, third and fourth exhaust gas expansion chambers are connected in this order to form an exhaust channel, and the first exhaust gas expansion chamber is connected to the exhaust pipe, and said fourth exhaust expansion chamber is connected to the exhaust gas emission pipe.

7. The silencer as in claim 5, wherein the silencer further comprises an outer sleeve which surrounds at least one region of the exhaust gas emission pipe, a number of small holes being formed in a region of the exhaust gas emission pipe, and a sound absorbing material is inserted into a gap between said outer sleeve and the exhaust gas emission pipe.

* * * * *